March 4, 1941.  V. J. WELCOME  2,233,682
ADJUSTABLE RAKE OR CULTIVATOR
Filed March 13, 1940
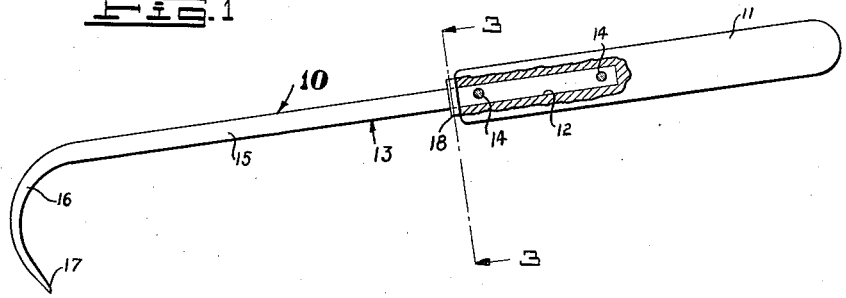
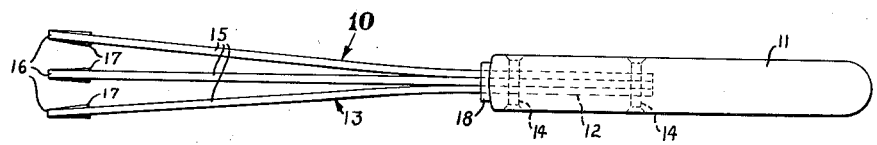
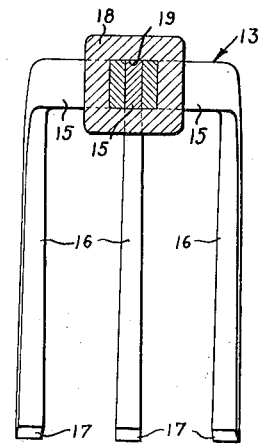
INVENTOR.
V. J. WELCOME
BY
ATTORNEY Patented Mar. 4, 1941

2,233,682

UNITED STATES PATENT OFFICE 2,233,682

ADJUSTABLE RAKE OR CULTIVATOR

Virgil J. Welcome, Eagle Rock, Calif.

Application March 13, 1940, Serial No. 323,767

1 Claim. (Cl. 97—64)

This invention relates to an adjustable rake or cultivator.

The general object of the invention is to provide an adjustable rake or cultivator having novel resilient tine members.

Another object of the invention is to provide an adjustable rake or cultivator including novel adjusting means for varying the effective width of the rake.

Other objects and the advantages of this invention will be apparent from the following description taken in connection with the accompanying drawing, wherein:

Fig. 1 is a side elevation, with parts broken away, showing an adjustable rake or cultivator embodying the features of my invention;

Fig. 2 is a top plan view of the adjustable rake or cultivator;

Fig. 3 is an enlarged section taken on line 3—3, Fig. 1; and

Fig. 4 is a fragmentary top plan view of the adjustable rake or cultivator with the tines in fully closed position.

Referring to the drawing by reference characters I have shown my invention as embodied in an adjustable rake or cultivator which is indicated generally at 10.

As shown the adjustable rake or cultivator 10 includes a handle 11 having an aperture 12 therein which is rectangular in cross section. In the aperture 12 I arrange the ends of a plurality of resilient tine members 13. The tine members are made of metal and are preferably rectangular in cross section and their combined cross sectional area substantially equals the cross sectional area of the aperture 12. Rivets 14 serve to hold the tine members in place.

The tine members 13 include shank portions 15 and hook portions 16 remote from the handle 11. The hook portions 16 are preferably flattened to form tooth shaped ends 17.

The tines normally assume the position shown in Fig. 2 due to their resiliency.

A slide 18 having an aperture 19 (see Fig. 3) is mounted on the shank portions 15. The aperture 19 is shown as rectangular and its area substantially equals the combined cross sectional area of the tines 13.

When the slide 18 is positioned adjacent the handle as shown in Fig. 2, the normal curve of the tines space the teeth a maximum distance apart. When the slide 18 is moved to a position adjacent the hooked portions 16 as shown in Fig. 4, the shanks 15 are held together and the teeth 17 are brought into engagement to form a single hook. By moving the guide 18 to intermediate points along the shank portions 15 the spaced relation of the teeth 17 may be adjusted as desired.

For working in a garden where the plants are well spaced or where soft ground is encountered the operator would move the guide 18 to the position shown in Fig. 2. For working in a garden wherein the plants are so close together as to prevent the rake or cultivator from being used in the normal position the guide 18 can be moved towards the position shown in Fig. 4 until the desired width is obtained. If hard ground is encountered the guide may be positioned as shown in Fig. 4 and the single rigid hook used to penetrate the hard ground.

It will be understood that the implement may be used as a hoe as well as a rake or cultivator.

From the foregoing description it will be apparent that I have invented a novel rake or cultivator which can be economically manufactured and which is highly efficient for its intended purpose.

Having thus described my invention, I claim:

In a cultivator, a handle, a plurality of resilient tine members, each of said tine members being rectangular in cross section and each tine member including an integral shank portion and a hooked soil working portion, said handle having a rectangular aperture, said shank portion being positioned in said handle aperture, said tine members being arranged in the handle aperture so that the members may be brought together with adjacent flat sides in direct engagement, fastening means for securing said shank portion in said handle, said hook portions each including a flattened tooth, said shank portions being normally held divergent by the resiliency of the material whereby the hook portions and the teeth are normally spaced apart and a slide on said shank portions, said slide having a rectangular aperture of a size to slidably receive the shank portions, said slide being movable along the tines from said handle to said hook portions to vary the spaced relation of said hook portions, said slide when moved from adjacent the handle towards the hook portions urging shank portions and said hook portions into direct engagement.

VIRGIL J. WELCOME.